(12) United States Patent
Cagno et al.

(10) Patent No.: US 7,558,039 B2
(45) Date of Patent: Jul. 7, 2009

(54) METHOD, APPARATUS, AND COMPUTER PROGRAM PRODUCT FOR DETECTING EXCESS CURRENT FLOW IN A PLUGGABLE COMPONENT

(75) Inventors: Brian J. Cagno, Tucson, AZ (US); John C. Elliott, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 11/737,418

(22) Filed: Apr. 19, 2007

(65) Prior Publication Data

US 2008/0259514 A1 Oct. 23, 2008

(51) Int. Cl.
*H02H 9/02* (2006.01)
(52) U.S. Cl. ..................... 361/93.9; 361/93.7
(58) Field of Classification Search ............... 361/93.7, 361/93.8, 93.9; 700/293, 297
See application file for complete search history.

(56) References Cited

U.S. PATENT DOCUMENTS

| | | | |
|---|---|---|---|
| 4,812,673 A | 3/1989 | Burchett | |
| 4,814,684 A | 3/1989 | McCurdy | |
| 5,130,636 A | 7/1992 | Kumar et al. | |
| 5,774,315 A * | 6/1998 | Mussenden | 361/18 |
| 5,844,440 A | 12/1998 | Lenk et al. | |
| 5,940,443 A | 8/1999 | Weir | |
| 6,557,106 B1 * | 4/2003 | Yuzawa et al. | 713/300 |

* cited by examiner

*Primary Examiner*—Danny Nguyen
(74) *Attorney, Agent, or Firm*—Cantor Colburn LLP; Randall Bluestone

(57) ABSTRACT

Detecting excess current flow in a pluggable component is performed by completing a first current supply path between a power source and a pluggable component, and subsequently completing a second current supply path in parallel with the first current supply path. The first and second current supply paths form a current divider for supplying the pluggable component with electrical power from the power source. The first current supply path includes a current sensing mechanism for sensing current consumption of the pluggable component. The sensed current consumption is used to provide excess current detection for the pluggable component.

20 Claims, 3 Drawing Sheets

METHOD, APPARATUS, AND COMPUTER PROGRAM PRODUCT FOR DETECTING EXCESS CURRENT FLOW IN A PLUGGABLE COMPONENT

BACKGROUND

The present invention relates generally to electrical current sensing and, more particularly, to a method, an apparatus, and a computer program product for detecting excess current flow in a pluggable component.

An electrical component that is configured to be plugged into a live electrical power system will generally require some type of inrush current detection or limiting. In many cases, this is because power supply bypass capacitors in the component will attempt to charge up very rapidly when suddenly attached to a supply voltage, creating a high current flow within the component. For illustrative purposes, the component may represent a card being inserted into a "live", i.e., electrically powered, system. As a result, various electrical contacts in the component may be damaged due to arcing, or the supply voltage may be pulled down, thereby interrupting operation of any additional circuitry connected to the same power supply. Further, an almost universal requirement for pluggable components, whether pluggable into live power supplies or not, is that they should be fault current limited. In other words, if a fault occurs, either in a particular component or in a load attached to that component, the input current to the component must be limited in order to prevent the possibility of a fire occurring due to excessive power dissipation, and also to prevent overloading of one or more system power supplies used to provide the supply voltage.

Many solutions to the problems posed by excess current limiting have been advocated. A common solution has been to insert a current limiting resistor in series between a supply bus of the power supply and the component. This approach has its drawbacks, however. First, power is dissipated in the current limiting resistor, even during normal operation, thereby causing excess heat dissipation and reduced component efficiency. Second, the current limiting resistor has two contradictory requirements. During normal operation, there should be a low voltage drop across the resistor so as to ensure that the supply bus voltage remains in regulation. Yet in the presence of a fault, there must be a sufficiently high voltage drop across the resistor to permit the fault to be identified, but such a voltage drop will result in high power dissipation. This drawback limits use of this approach to only very low current applications around a few hundred milliamps.

Another solution to inrush current limiting involves the use of a specially configured power pin. The pluggable component is equipped with a plurality of pins for insertion into a connector energized with electrical power from a power supply. The plurality of pins includes a longer power pin that is longer than the remaining pins such that, upon insertion, the longer power pin makes electrical contact with the connector before the remaining pins make electrical contact. The longer power pin is wired in series with a resistor that limits precharge current. Typically, this resistor is in the range of 1 to 2 ohms. The remaining pins include one or more supply pins for supplying electrical power to the pluggable component while the component is operational. During operation of the pluggable component, the power pin does not supply significant current to the component because the supply pins provide a lower impedance path relative to the power pin. Unfortunately, this scheme does not protect the power supply from faults, which may occur in the pluggable component after the component has been plugged into the connector. This approach also does not provide for over current protection during operation of the pluggable component.

More sophisticated techniques for limiting inrush current involve placing a MOSFET in series between the power connector and the pluggable component. The gate of the MOSFET is controlled, for example, by an RC circuit, which turns the MOSFET on slowly during startup, allowing the power supply bypass capacitors in the component to charge slowly. During steady state operation, the MOSFET provides a low voltage drop.

Unfortunately, MOSFET-based current limiters suffer from one or more problems. For example, MOSFET circuits have an inherently high failure rate due to the mean time before failure (MTBF) of such components, whereas one design objective of a power system is to have the lowest failure rate practicable. Design of MOSFET-based current limiter circuits is complicated by the fact that MOSFETs are inefficient in the linear region, which unfortunately, is the operational region of the device during inrush protection. Furthermore, MOSFET-based current limiters typically require relatively large electrical components to prevent the limiter from overheating due to a fault, thereby resulting in a limiter that is too large and bulky for integration into many types of circuits.

Accordingly, it would be desirable to provide a current limiter that limits the inrush surge current of a pluggable component during startup or in the presence of a fault without experiencing the aforementioned problems of prior art current limiters, in a manner that does not result in excessive thermal dissipation or reduced pluggable component efficiency, and in a manner that provides power metering capabilities in addition to protection.

SUMMARY

The foregoing discussed drawbacks and deficiencies of the prior art are overcome, alleviated, or improved upon by completing a first current supply path between a power source and a pluggable component, and subsequently completing a second current supply path in parallel with the first current supply path. The first current supply path provides an impedance to limit inrush current for the component. The second current path provides an operational current for the component after the component is plugged into the power source. The first and second current supply paths form a current divider for supplying the pluggable component with electrical power from the power source. The first current supply path includes a current sensing mechanism for measuring current flow through the first path. Current flow through the second path is inferred from the measured current in the first path. The first current supply path has a higher impedance than the second current supply path.

BRIEF DESCRIPTION OF THE DRAWINGS

Referring to the exemplary drawings wherein like elements are numbered alike in the several Figures.

DETAILED DESCRIPTION

Disclosed herein is a method, an apparatus, and a computer program product for detecting excess current flow in a pluggable component. Briefly stated, the embodiments disclosed herein complete a first current supply path between a power source and a pluggable component, and subsequently complete a second current supply path in parallel with the first current supply path. A current sensing mechanism in the first current supply path provides inrush current limiting for the pluggable component.

For illustrative purposes, the pluggable component may include a plurality of contacts capable of mating with a connector energized with electrical power from the power source. The plurality of contacts may include at least one power contact in series with the current sensing mechanism and one or more remaining contacts. The current sensing mechanism may, but need not, be a current limiting resistor. Accordingly, for purposes of the present illustrative example, the first current supply path includes the power contact, and the second current supply path includes the one or more remaining contacts. The first and second current supply paths form a current divider for supplying the pluggable component with power, whereas presently existing configurations provide a first current supply path that has a much higher impedance than the second current supply path. Electrical contact between the power contact and the connector occurs before the one or more remaining contacts make electrical contact with the connector, thus providing inrush current limiting for the pluggable component. Once the pluggable component is fully inserted into the connector, the one or more remaining contacts, providing a the lower impedance path relative to the first current supply path, will supply current to the pluggable component such as a card.

Figure 1:
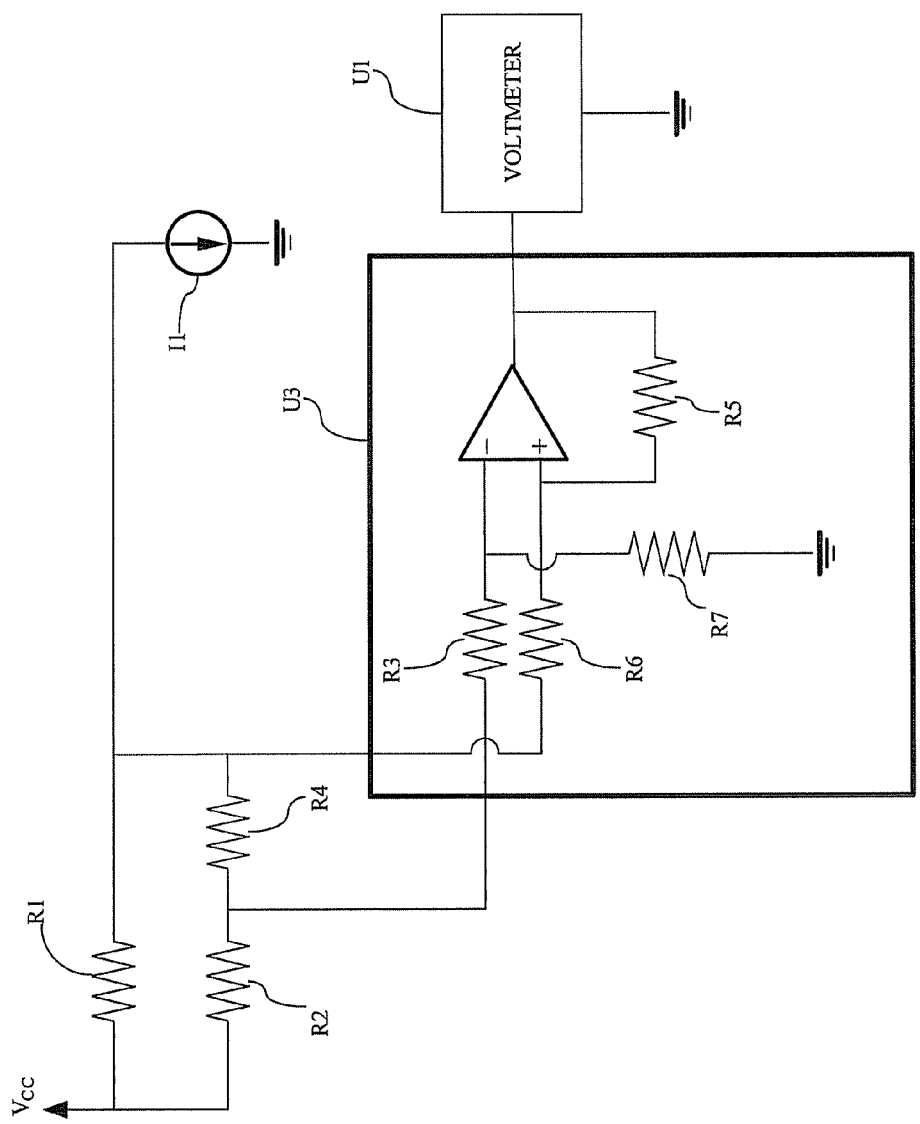
FIG. 1 is an illustrative electrical schematic diagram of an apparatus for detecting excess current flow in a pluggable component.

FIG. 1 is an electrical schematic diagram of an apparatus for detecting excess current flow in a pluggable component. A pluggable component or other simulated load, such as a pluggable system card, maybe conceptualized as an adjustable current load I1. As current load I1 draws current from a power supply $V_{CC}$, a voltage drop is created due to the resistance of the power supply $V_{CC}$ and the impedances R1 and R2 of the conductive paths between the component and the power supply $V_{CC}$. These impedances R1 and R2 are effectively defined by the structure and configuration of the energized backplane to which one or more pluggable components may be connected, as well as the electrical characteristics of power supply $V_{CC}$. Accordingly, R1 and R2 represent the resistances of the voltage planes and connector systems used.

With pluggable system cards that can be plugged into an energized backplane, the card or the energized backplane may include a pre-charge resistor R4 that forms a first conductive path between the card and the energized backplane as the card is being connected to the backplane. The first conductive path includes impedance R2 (typically equal to R1) and pre-charge resistor R4. Shortly thereafter, a second conductive path including impedance R1 is formed between the card and the energized backplane, such that the second conductive path is in parallel with the first conductive path. The series combination of pre-charge resistor R4 and impedance R2 is placed in parallel across impedance R1, thus permitting the overall resulting impedance of the resistor-backplane combination including R1, R2, and R4 to be measured. R4 will be sufficiently large such that R1 will supply the vast majority of the current and the current across R4 will be proportional but much lower, possibly on the order of 1,000 to 10,000 times smaller.

By adding a high gain differential amplifier U3 across pre-charge resistor R4, a voltage proportional to the current flow across system impedance R1 is generated and amplified to a level suitable for monitoring by an analog-to-digital converter or a voltmeter U1. The gain of high-gain differential amplifier U3 is determined by selecting appropriate values for R3, R5, R6, and R7 as is well known by those of ordinary skill in the relevant art. The voltage output of the differential amplifier, as measured at voltmeter U1, is proportional to the overall current consumed by the pluggable component since pre-charge resistor R4 is effectively in parallel with the second conductive path including system impedance R1 between the pluggable component and power supply $V_{CC}$. Once a voltage is generated at voltmeter U1 that is proportional to a current drawn by current load I1, an analog-to-digital (A-to-D) converter can be used to monitor this current draw. Any of various types of A-to-D converters could be used for this purpose, including but not limited to an Inter-IC (I2C) interface, a parallel interface, a serial peripheral interface (SPI) interface, a built in service processor, and/or hardware components such as a comparator.

Illustrative values for impedances R1 and R2 may, but need not, be approximately 0.001 ohms. These resistors may be selected based upon the calculated, estimated, or predicted impedances that are present in the energized backplane. Pre-charge resistor R4 may, but need not, be approximately 2 ohms. In practice, R4 is selected based upon the maximum permissible current spike that may occur during connection of the pluggable component to the energized backplane. R3 and R6 may, but need not, be approximately 1 kilohm. R5 and R7 may, but need not, be 50 kilohms. For example, R5 and R7 may be selected to as to obtain a desired voltage or range of voltages at voltmeter U1. Voltmeter U1 may, but need not, have an internal impedance of at least one megohm. Optionally, voltmeter U1 may include a processing mechanism, such as a microprocessor associated with electronic memory, wherein the electronic memory stores one or more predetermined voltage thresholds.

Figure 2:
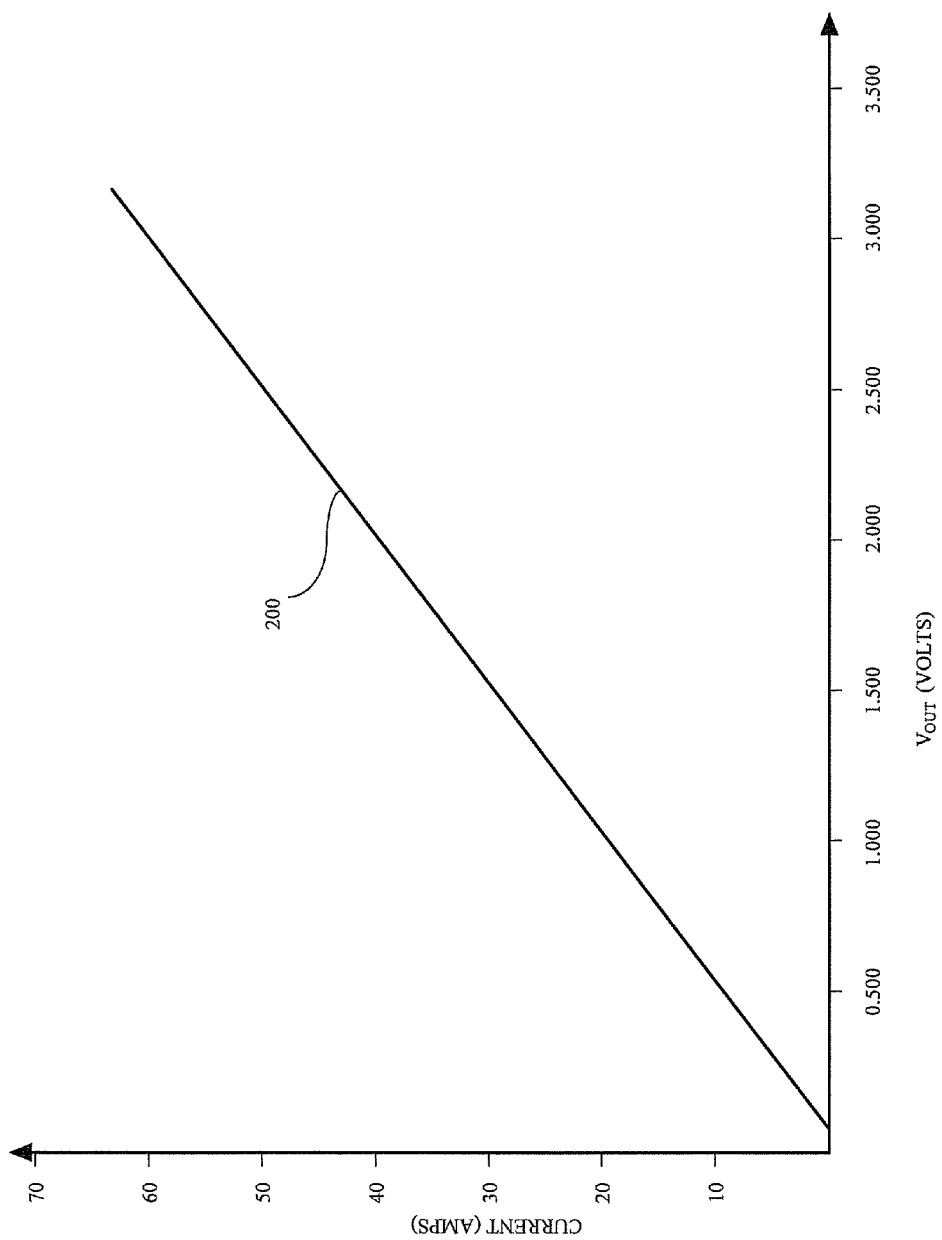
FIG. 2 is an illustrative plot of current versus voltage for the apparatus of FIG. 1.

FIG. 2 is an illustrative plot 200 of current drawn by current load I1 (in amps) versus voltage $V_{OUT}$ (in volts) for the apparatus of FIG. 1 using illustrative resistor values. Voltage $V_{OUT}$ is the voltage measured by voltmeter U1 of FIG. 1, whereas the current drawn by current load I1 is the current drain resulting from application of the simulated load or pluggable component to the energized backplane. Observe that plot 200 is quite linear within an amperage range of 0 to 70 amps and a voltage range of 0.1 to 3.5 volts. The plot 200 of FIG. 2 indicates that voltage $V_{OUT}$ is proportional to current drawn by current load I1 for the circuit of FIG. 1.

Figure 3:
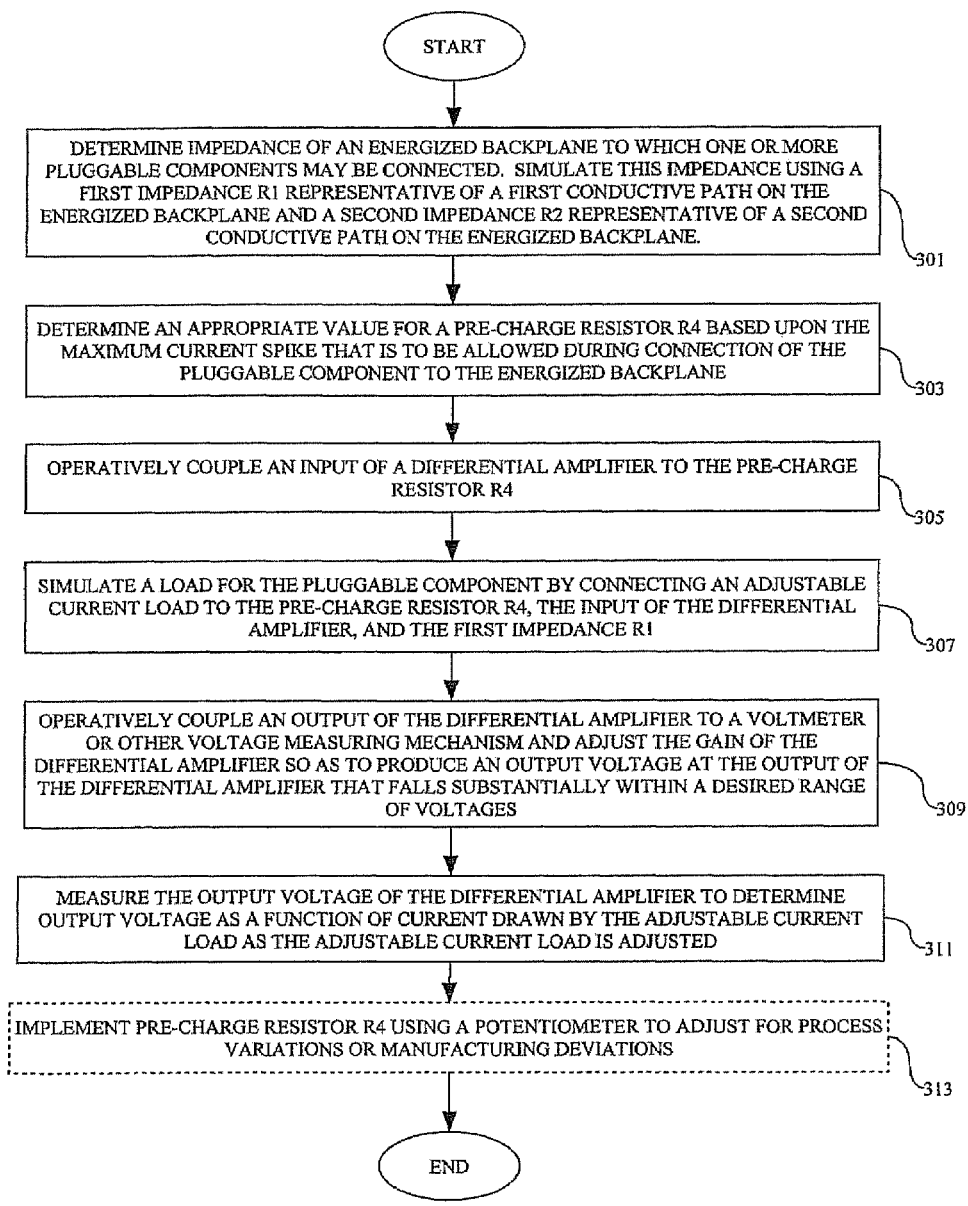
FIG. 3 is a flowchart setting forth a method of detecting excess current flow in a pluggable component.

FIG. 3 is a flowchart setting forth a method of detecting excess current flow in a pluggable component for use with the circuit of FIG. 1. The method commences at block 301 (FIG. 3) where energized backplane impedances R1 and R2 (FIG. 1) are determined. For example, these impedances (R1 and R2) may be calculated, simulated, predicted, estimated, interpolated, or measured. Impedance R1 may represent, for example, the impedance of a first conductive path on the energized backplane between a power supply and a connector capable of accepting a pluggable component. Similarly, impedance R2 may represent the impedance of a second conductive path on the energized backplane between the power supply and the connector. Next, at block 303 (FIG. 3), an appropriate value for pre-charge resistor R4 (FIG. 1) is determined based upon the maximum current spike that is allowed during connection of the pluggable component to the energized backplane. At block 305 (FIG. 3), an input of a differential amplifier U3 (FIG. 1) is operatively coupled to pre-charge resistor R4.

At block 307 (FIG. 3), a load is simulated for a pluggable component by connecting an adjustable current load I1 (FIG. 1) to R1, R4 and the input of the differential amplifier U3. The gain of differential amplifier U3 is adjusted by selecting appropriate values for R5 and R7 so as to produce voltage outputs at voltmeter U1 that fall substantially within a desired range of voltages (FIG. 3, block 309). For example, the component values discussed previously in conjunction with FIG. 2 will perform well for 3.3-volt energized backplane systems drawing anywhere between 1 and 60 amps. Next, at block 311 (FIG. 3), voltage $V_{OUT}$ (in volts, FIG. 2) is determined as a function of current drawn by current load I1 (in amps, FIG. 2). For example, applying the graph of FIG. 2 to the circuit configuration of FIG. 1 yields a formula as follows: $V=(I*0.050)+0.050$. Optionally, at block 313 (FIG. 3) if further accuracy is desired, pre-charge resistor R4 (FIG. 1) may be implemented as a potentiometer and can be used to adjust for process variations or manufacturing deviations.

Beyond measuring current, optional programmable thresholds may be implemented for monitoring sharp voltage increases. These sharp voltage increases may be indicative of pluggable component failure. By monitoring voltage, power can be removed from a pluggable component when a possible failure is detected so as to limit the extent to which the pluggable component is damaged, so as to limit unnecessary stress on the power supply, and so as to limit the thermal dissipation of the pluggable component and power supply.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electric wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications maybe made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for detecting excess current flow in a pluggable component, the method comprising:

completing a first current supply path between a power source and the pluggable component;

subsequently completing a second current supply path in parallel with the first current supply path, wherein the first and second current supply paths form a current divider for supplying the pluggable component with electrical power from the power source;

providing the first current supply path with a current sensing mechanism for sensing current consumption of the pluggable component; and using the sensed current consumption to provide excess current detection for the pluggable component.

2. The method of claim 1 further comprising using a current limiting resistor as the current sensing mechanism.

3. The method of claim 2 wherein the pluggable component includes a plurality of contacts capable of mating with a connector energized with electrical power, the plurality of contacts including at least one power contact in series with the current limiting resistor and one or more remaining contacts, the method comprising completing the first current supply path by providing electrical contact between the connector and the power contact.

4. The method of claim 3 further comprising subsequently completing the second current supply path by providing electrical contact between the one or more remaining contacts and the connector.

5. The method of claim 4 wherein the current limiting resistor is operatively coupled to an input of a differential amplifier.

6. The method of claim 5 wherein the differential amplifier is capable of generating an output voltage substantially proportional to a current flow through the current limiting resistor.

7. The method of claim 6 further comprising establishing one or more programmable voltage thresholds, monitoring the output voltage of the differential amplifier, and if the monitored voltage exceeds the one or more programmable voltage thresholds, interrupting or disconnecting or switching off power supplied to the pluggable component from the power source.

8. A computer program product for simulating a current flow of a pluggable component, the computer program product comprising a storage medium readable by a processing circuit and storing instructions for execution by the processing circuit for facilitating a method comprising:

determining an impedance of a current supply path between a power source and a pluggable component, wherein the current supply path includes an energized backplane that is capable of being energized with power from the power source;

determining a value for a pre-charge resistor based upon a maximum current spike to be allowed during connection of the pluggable component to the energized backplane;

operatively coupling the pre-charge resistor to an input of a differential amplifier;

simulating a load by connecting an adjustable current load to the energized backplane, the input of the differential amplifier, and the pre-charge resistor; and measuring a voltage output of the differential amplifier to determine voltage output as a function of current produced by the adjustable current load as the current load is adjusted.

9. The computer program product of claim 8 wherein the pre-charge resistor is implemented as a potentiometer.

10. An apparatus for detecting excess current flow in a pluggable component, the apparatus comprising:

a current delivery mechanism having a first current supply path configured to be completed between a power source and the pluggable component;

the current delivery mechanism having a second current supply path configured to be coupled to the power source and the pluggable component in parallel with the first current supply path, wherein the first and second current supply paths form a current divider for supplying the pluggable component with electrical power from the power source;

a current sensing mechanism in the first current supply path for sensing current consumption of the pluggable component; and a current limiting mechanism, responsive to the current sensing mechanism, for using the sensed current consumption to provide excess current detection for the pluggable component.

11. The apparatus of claim 10 wherein the current sensing mechanism comprises a current limiting resistor.

12. The apparatus of claim 11 wherein the pluggable component includes a plurality of contacts capable of mating with a connector energized with electrical power, the plurality of contacts including at least one power contact in series with the current limiting resistor and one or more remaining contacts, the current delivery mechanism completing the first current supply path by providing electrical contact between the connector and the power contact.

13. The apparatus of claim 12 wherein the current delivery mechanism completes the second current supply path after the first current supply path is completed by providing electrical contact between the one or more remaining contacts and the connector.

14. The apparatus of claim 13 further comprising a differential amplifier having an input and an output, wherein the current limiting resistor is operatively coupled to the input of the differential amplifier, the differential amplifier capable of generating an output voltage substantially proportional to a current flow through the current limiting resistor.

15. The apparatus of claim 14 further comprising a processing mechanism operatively coupled to the differential amplifier output voltage, wherein the processing mechanism comprises a microprocessor associated with electronic memory.

16. The apparatus of claim 15 wherein one or more programmable voltage thresholds for the output voltage of the differential amplifier are stored in the electronic memory.

17. The apparatus of claim 16 wherein the processing mechanism monitors the output voltage of the differential amplifier.

18. The apparatus of claim 17 wherein, if the monitored voltage exceeds the one or more programmable voltage thresholds, initiating an interrupting or disconnecting or switching off of power supplied to the pluggable component from the power source.

19. An apparatus for simulating a current flow of a pluggable component based upon calculating, simulating, or measuring an impedance of a current supply path between a power source and a pluggable component, wherein the current supply path includes an energized backplane that is capable of being energized with power from the power source, the apparatus including:

a pre-charge resistor having a value determined by a maximum current spike to be allowed during connection of the pluggable component to the energized backplane;

a differential amplifier having an input and an output, the input of the differential amplifier being operatively coupled to the pre-charge resistor;

an adjustable current load for simulating a current drain of a pluggable component connected to the energized backplane, the current load being connected to the energized backplane, the input of the differential amplifier, and the pre-charge resistor; and measuring a voltage at the output of the differential amplifier to determine voltage output as a function of current produced by the adjustable current load as the current load is adjusted.

20. The apparatus of claim 19 wherein the pre-charge resistor comprises a potentiometer.

* * * * *